United States Patent
Van Dijke et al.

(10) Patent No.: US 12,089,611 B2
(45) Date of Patent: Sep. 17, 2024

(54) TWO-STEP EMULSIFICATION PROCESS FOR PREPARING INFANT FORMULA

(71) Applicant: N. V. NUTRICIA, Zoetermeer (NL)

(72) Inventors: Koen Cornelis Van Dijke, Utrecht (NL); Jewe Schröder, Utrecht (NL); Memet Ali Ustunel, Utrecht (NL); Daniël Georg Reinhold Halsema, Utrecht (NL); Raoul Charles Johan Moonen, Utrecht (NL)

(73) Assignee: N. V. NUTRICIA, Zoetermeer (NL)

( * ) Notice: Subject to any disclaimer, the term of this patent is extended or adjusted under 35 U.S.C. 154(b) by 780 days.

(21) Appl. No.: 15/558,458

(22) PCT Filed: Mar. 11, 2016

(86) PCT No.: PCT/EP2016/055223
§ 371 (c)(1),
(2) Date: Sep. 14, 2017

(87) PCT Pub. No.: WO2016/146496
PCT Pub. Date: Sep. 22, 2016

(65) Prior Publication Data
US 2018/0092376 A1    Apr. 5, 2018

(30) Foreign Application Priority Data
Mar. 16, 2015   (EP) .................................... 15000765

(51) Int. Cl.
| | | |
|---|---|---|
| A23D 9/05 | (2006.01) | |
| A23D 7/005 | (2006.01) | |
| A23D 7/01 | (2006.01) | |
| A23L 3/46 | (2006.01) | |
| A23L 33/00 | (2016.01) | |
| A23L 33/115 | (2016.01) | |
| A23P 10/40 | (2016.01) | |

(52) U.S. Cl.
CPC ............. *A23D 9/05* (2013.01); *A23D 7/0053* (2013.01); *A23D 7/011* (2013.01); *A23L 3/46* (2013.01);
(Continued)

(58) Field of Classification Search
CPC ... A22C 7/0069; A22C 7/0076; A22C 7/0084; A23P 30/10; A23V 2250/54246;
(Continued)

(56) References Cited

U.S. PATENT DOCUMENTS

| 4,959,350 A | 9/1990 | Frokjaer et al. |
| 2013/0251845 A1 | 9/2013 | Erdmann et al. |

(Continued)

FOREIGN PATENT DOCUMENTS

| EP | 2465359 A1 | 6/2012 |
| EP | 2638811 A1 | 9/2013 |

(Continued)

OTHER PUBLICATIONS

Borel, P. et al.: "Digestion and Absorption of Tube-Feeding Emulsions with Different Droplet Sizes and Compositions in the Rat", Journal of Parenteral and Enteral Nutrition, 18, Nov. 1, 1994, pp. 534-545 (entire article).

(Continued)

*Primary Examiner* — Donald R Spamer
*Assistant Examiner* — Assaf Zilbering
(74) *Attorney, Agent, or Firm* — Harness, Dickey & Pierce, P.L.C.; Stephen T. Olson

(57) ABSTRACT

The present invention relates to a two-step emulsification process for preparing a lipid and protein component-containing composition comprising large lipid globules, preferably coated with polar lipids, and to the compositions obtained thereby. Optionally, the lipid and protein component-containing composition is spray-dried. The obtained compositions are for feeding infants and young children.

23 Claims, 1 Drawing Sheet

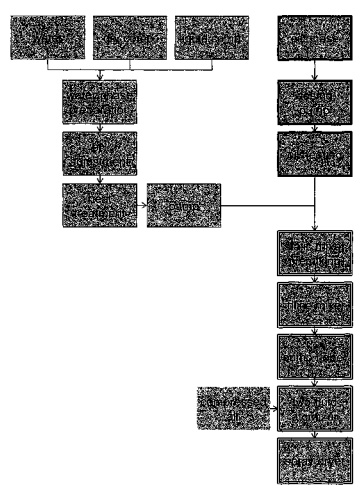

(52) U.S. Cl.
CPC ............. *A23L 33/115* (2016.08); *A23L 33/40* (2016.08); *A23P 10/40* (2016.08); *A23V 2002/00* (2013.01); *A23V 2250/18* (2013.01); *A23V 2250/54246* (2013.01); *A23V 2250/54252* (2013.01); *A23V 2250/5488* (2013.01); *A23V 2250/612* (2013.01); *A23V 2250/70* (2013.01); *A23V 2300/26* (2013.01); *A23V 2300/31* (2013.01)

(58) Field of Classification Search
CPC .......... A23V 2250/612; A23V 2300/26; A23V 2250/54252; A23L 3/46; A23L 33/115; A23L 33/40; A23D 7/011; A23D 9/05
See application file for complete search history.

(56) References Cited

U.S. PATENT DOCUMENTS

| | | |
|---|---|---|
| 2014/0255539 A1 | 9/2014 | Banavara et al. |
| 2015/0079265 A1 | 3/2015 | Van Den Brenk et al. |

FOREIGN PATENT DOCUMENTS

| | | | | |
|---|---|---|---|---|
| WO | WO-2005/051091 A1 | 6/2005 | | |
| WO | WO-2010/027259 A1 | 3/2010 | | |
| WO | WO-2010/068105 A1 | 6/2010 | | |
| WO | WO-2011/108918 A1 | 9/2011 | | |
| WO | WO-2013/135739 A1 | 9/2013 | | |
| WO | WO-2013135738 A1 * | 9/2013 | ............. | A23D 9/007 |
| WO | WO-2013/135738 A8 | 11/2013 | | |
| WO | WO-2014/143523 A1 | 9/2014 | | |
| WO | WO-2015036046 A1 * | 3/2015 | ........... | A23D 7/0053 |

OTHER PUBLICATIONS

International Search Report and Written Opinion of the ISA for PCT/EP2016/055223, ISA/EP, Rijswijk, NL, mailed May 11, 2016.
International Preliminary Report on Patentability with Annexes IPEA/EP, Munich, issued Jul. 6, 2017.
Borel, P. et al.: "Digestion and Absorption of Tube-Feeding Emulsions with Different Droplet Sizes and Compositions in the Rat", Journal of Parenteral and Enteral Nutrition, 18, Nov. 1, 1994, pp. 534-545 (Abstract).

* cited by examiner

```
┌───────┐  ┌───────────┐  ┌──────────────┐          ┌───────────┐
│ water │  │ dry comp. │  │ liquid comp. │          │ oil phase │
└───┬───┘  └─────┬─────┘  └──────┬───────┘          └─────┬─────┘
    └────────────┼───────────────┘                        ▼
                 ▼                                  ┌───────────┐
        ┌─────────────────┐                         │  dosing   │
        │   water phase   │                         │   pump    │
        │   preparation   │                         └─────┬─────┘
        └────────┬────────┘                               ▼
                 ▼                                  ┌───────────┐
            ┌────────┐                              │    oil    │
            │   pH   │                              │  heating  │
            │ adjust.│                              └─────┬─────┘
            └────┬───┘                                    │
                 ▼                                        │
            ┌────────┐   ┌──────┐                         │
            │  heat  │──▶│ pump │─────────────────────────┤
            │ treat. │   └──────┘                         ▼
            └────────┘                          ┌──────────────────┐
                                                │   static mixer   │
                                                │   (premixing)    │
                                                └────────┬─────────┘
                                                         ▼
                                                ┌──────────────────┐
                                                │   inline mixer   │
                                                └────────┬─────────┘
                                                         ▼
                                                ┌──────────────────┐
                                                │   pump (lobe)    │
                                                └────────┬─────────┘
                                                         ▼
                            ┌────────────┐      ┌──────────────────┐
                            │ compressed │─────▶│    two-fluid     │
                            │    air     │      │    atomizer      │
                            └────────────┘      └────────┬─────────┘
                                                         ▼
                                                ┌──────────────────┐
                                                │   spray dryer    │
                                                └──────────────────┘
```

TWO-STEP EMULSIFICATION PROCESS FOR PREPARING INFANT FORMULA

CROSS REFERENCE TO RELATED APPLICATIONS

This application is a 371 U.S. National Stage of International Application No. PCT/EP2016/055223, filed Mar. 11, 2016, which claims the benefit of and priority to European Patent Application No. 15000765.6, filed Mar. 16, 2015. The disclosures of the above applications are incorporated herein by reference.

The present invention relates to a process for preparing a lipid and protein component-containing composition comprising large lipid globules, preferably coated with polar lipids and to the composition obtained thereby. Optionally, the lipid and protein component-containing composition is dried, preferably spray-dried or belt-dried. The obtained compositions are for feeding infants and young children.

Infant or follow-on formulae are used successfully for feeding infants in cases where breast-feeding is impossible or less desirable. Still, the composition of such formulations should resemble breast milk as closely as possible, which is the preferred method of feeding infants to accommodate the special nutritional requirements of the fast growing and developing infant.

In natural unprocessed mammalian milk, lipids occur primarily as triglycerides contained within emulsified globules with a mean diameter of approximately 4 μm. These globules are surrounded by a structural membrane composed of phospholipids (0.2 to 1 wt. % based on total fat), glycolipids, cholesterol, enzymes, proteins, and glycoproteins. The major part of the fat component used in infant or follow-on formulae is of vegetable origin. The use of a large part of cow's milk fat is less desirable, because of a more unfavourable fatty acid profile. Additionally, long-chain polyunsaturated fatty acids of microbial, fish or egg origin are typically added to improve the fatty acid profile.

In known processes for preparing infant or follow-on formulae the fat or lipid phase comprising lipids and lipid-soluble vitamins is mixed vigorously with the aqueous phase comprising proteins and carbohydrates and the mixture is homogenised under high pressure by a conventional high pressure homogeniser alone or in combination with a high pressure pump. Thus, during homogenisation the fat phase is compartmentalized into smaller droplets so that it no longer separates from the aqueous phase and collects at the top, which is called creaming. This is accomplished by forcing the mixture at high pressure through a small orifice. This homogenisation step results in a stable oil-in-water emulsion, comprising lipid globules with a mode volume-weighted diameter of 0.1 to 0.5 μm. Due to this small globule size, which results in an increased lipid globule surface area, the relatively small amount of polar lipids, such as phospholipids, typically present in such compositions wherein the fat is mainly of vegetable origin is not sufficient to ensure that the distribution of the phospholipids corresponds to unprocessed lipid globules. Instead, the amount of protein, in particular casein, covering the lipid globules increases.

This is in contrast with the structure of lipid globules in unprocessed or raw milk, such as human milk, wherein the lipid globules are larger and the lipid globules are covered with a milk globule membrane comprising polar lipids in higher quantities than the above described processed IMF (infant milk formula). The preparation of larger lipid globules is thus desirable in order to prepare infant or follow-on formulae which more closely resemble human milk. Nutritional compositions with vegetable fat having larger lipid globules were also recently found to have long term health benefits with regard to body composition and prevention of obesity later in life. WO 2010/027258 discloses nutritional compositions with vegetable fat having larger lipid globules which are produced by applying a homogenisation step using lower pressure. WO 2010/027259 discloses nutritional compositions with larger lipid globules coated with polar lipids using a homogenisation step with a lower pressure and a higher amount of polar lipids, in particular phospholipids, present before homogenisation.

WO 2010/027258, WO 2010/027259, WO 2011/108918 and WO 2010/068105 disclose the preparation of nutritional compositions comprising a process step of mixing an aqueous phase with an oil blend using an Ultra-Turrax T50 batch mixer. In the mixing chamber of a batch mixer heterogenous mixing conditions are present, resulting in a broad lipid droplet size distribution and the formation of partially very large lipid globules. Furthermore, the liquid phases to be mixed are subjected in a batch mixer for an extended time to changing mixing conditions thereby reinforcing the upper identified effects of producing a broad droplet size distribution and forming extremely small and extremely large lipid globules. Due to inhomogeneous mixing a batch mixer disadvantageously has a higher risk of large and small fat globules.

WO 2005/051091 relates to a lipid preparation which mimics the lipid phase of human milk. The lipid preparation is produced by a homogenisation step to form a substantially homogeneous dispersion or emulsion under suitable conditions which include temperature, pressure and physical manipulation.

Borel et al. (J of Parenteral and Enteral Nutrition (1994), 18, 534-543) discloses the preparation of tube-feeding emulsions with different droplet sizes and compositions for feeding rats, wherein an emulsion from a lipid and an aqueous phase is prepared by magnetically stirring the mixture with a magnetic bar and further refining the prepared emulsion by sonification. Such a process is not suitable for a larger scale and will give too large variation in the globule size.

Thus, most of these known processes employ high pressure mixing devices, in particular homogenisers and/or high pressure pumps. In the processes employing homogenisers mostly two pressure steps are needed resulting in a capital intensive production process. Further, if low pressures are used with these homogenisers which are especially designed to use high pressures to allow for homogenisation, the operation process is hard to control in a stable way, that means the process needs a high amount of additional control which is laborious, time consuming and can result in varying end product qualities. Thus, the commercially used machinery is overdimensioned and has a low energy efficiency. This renders these processes less preferred for an economical production.

WO 2013/135738 and WO 2013/135739 disclose processes for preparing infant formulas which are suitable for feeding infants and young children. The processes disclosed therein employ a step of mixing a lipid phase with an aqueous phase so as to obtain a lipid and protein component-containing composition comprising lipid globules wherein only low shear forces are to be applied during the course of the mixing and in particular also of the whole process disclosed. These low shear forces, particularly employed during mixing, are sufficient and necessary to provide lipid globules with the desired particle size distribution. Both documents disclose that subsequent to said mixing step an atomization step may take place so as to spray dry the mixed emulsion. During the spray drying step, the same level of shear forces and at most a shear force as applied during the mixing step shall be used so as not to substantially alter the particle size distribution of the lipid globules obtained by the mixing step. Thus, in these processes, essentially only one particle size determining homogenization step takes place. Accordingly, after the mixing step carried out in said one-step homogenization processes, careful processing of the steps after said mixing is required to ensure that the lipid globules keep essentially their size and are not broken down to undesired particle size. Accordingly, although said processes provide advantageous properties both to the process itself and the products obtained, an even more controlled production of a particular lipid globule size distribution of the globules obtained is desired.

The technical problem underlying the present invention is therefore to provide a process for the preparation of a lipid and protein component-containing composition comprising large lipid globules, preferably coated with polar lipids, which allows to produce said composition without the above mentioned disadvantages, in particular allows for a reproducible and controlled production of lipid globules with a desired size distribution.

These technical problems are solved by the processes and compositions according to the independent claims.

Thus, the present invention provides in particular a process for preparing a lipid and protein component-containing composition, which preferably is an infant formula or a follow-on formula or a growing up milk and comprises lipid globules, comprising the steps of a) providing an aqueous phase with a dry matter content of 5 to 75 wt.-%, preferably 10 to 60 wt. % (each based on total weight of the aqueous phase), which comprises at least one protein component, b) providing a liquid lipid phase, which comprises at least one lipid, c) carrying out a first homogenization step by homogenizing the lipid phase with the aqueous phase in a ratio of 3 to 50% (w/w) so as to obtain a first lipid and protein component-containing composition comprising lipid globules, wherein at least 10 vol.-% of the lipid globules have a diameter of >12 µm and/or wherein the lipid globules have a volume-weighted mode diameter from 5 to 25 µm, and d) carrying out a second homogenization step by homogenizing the first lipid and protein component-containing composition obtained in step c) with an atomizer, wherein the particle size of the lipid globules obtained in step c) is reduced so as to obtain a second lipid and protein component-containing composition comprising lipid globules, wherein less than 10 vol.-% of the lipid globules have a diameter of >12 µm and/or wherein the lipid globules have a volume-weighted mode diameter from 2.5 to 7 µm.

Thus, the present invention relates to a process for preparing a lipid and protein component-containing composition, which preferably is an infant or follow-on formula or a growing up milk and which comprises lipid globules, comprising the steps of:
  a) providing an aqueous phase with a dry matter content of 5 to 75 wt.-%, preferably 10 to 60 wt. % (each based on total weight of the aqueous phase), which comprises at least one protein component,
  b) providing a liquid lipid phase, which comprises at least one lipid and
  c) carrying out a first homogenization step by homogenizing the lipid phase with the aqueous phase in a ratio of 3 to 50% (w/w) so as to obtain a first lipid and protein component-containing composition comprising lipid globules, wherein at least 10 vol.-%, at least 15 vol.-%, at least 20 vol.-%, preferably at least 30 vol.-%, of the lipid globules have a diameter of >12 µm and/or wherein the lipid globules have a volume-weighted mode diameter from 5 to 25 µm,
  d) carrying out a second homogenization step by homogenizing the first lipid and protein component-containing composition obtained in step c) with an atomizer, wherein the particle size of the lipid globules obtained in step c) is reduced so as to obtain a second lipid and protein component-containing composition comprising lipid globules, wherein less than 10 vol.-%, preferably less than 7 vol.-%, preferably less than 6 vol.-%, preferably less than 5 vol.-% of the lipid globules have a diameter of >12 µm and/or wherein the lipid globules have a volume-weighted mode diameter from 2.5 to 7 µm.

In a preferred embodiment of the present invention, during or after, in particular immediately after, carrying out the second homogenization step d), a drying step is performed, preferably a spray-drying step or a belt-drying step. Accordingly, in such a preferred embodiment when during or after the second homogenization step d) a drying step is performed, advantageously, a dried, preferably a spray-dried or a belt-dried, lipid and protein component-containing composition comprising lipid globules is obtained.

Preferably, the second homogenization step, that is step d), is a spray drying step.

In a particularly preferred embodiment of the present invention, the volume-weighted mode diameter of the lipid globules obtained in step c), which comprise at least 10 vol.-%, preferably at least 15 vol.-% and preferably at least 20 vol.-% of lipid globules with a diameter of >12 µm is from 5 to 25 µm, preferably from 6 to 18 µm and preferably from 7 to 15 µm and the volume-weighted mode diameter of the lipid globules obtained in step d) which comprise less than 10 vol.-%, preferably less than 7 vol.-%, preferably less than 6 vol.-% and preferably less than 5 vol.-% lipid globules with a diameter of >12 µm, is preferably from 2.5 to 7 µm, preferably from 2.5 to 6.0 µm and preferably from 3.0 to 6.0 µm.

In a particularly preferred embodiment of the present invention, the volume-weighted mode diameter of the lipid globules obtained in step c) is from 5 to 25 µm, preferably from 6 to 18 µm, preferably from 7 to 15 µm, preferably from 10 to 13 µm and the volume-weighted mode diameter of the lipid globules obtained in step d) is preferably from 2.5 to 7 µm, preferably from 2.5 to 6.0 µm and preferably from 3.0 to 6.0 µm.

The present process provides in its process step c) lipid globules which are significantly larger than desired to be obtained after step d), that means larger than to be desired in the composition to be prepared. According to the present invention, the present process produces in a first homogenization step c) a first lipid and protein component-containing composition comprising larger lipid globules in comparison to those which are obtained during a subsequent second homogenization step, wherein the first lipid and protein component-containing composition obtained in step c) has been subjected to an atomizing process step. Thus, the second homogenization step d) significantly changes the particle size distribution of the first lipid and protein component-containing composition, in particular reduces the particle size of the lipid globules. Advantageously, in step d) of the present invention the size of the lipid globules obtained in step c) is broken down to a reduced and therefore to the desired size of the lipid globules. The second lipid and protein component-containing composition comprising lipid globules is, thus, the desired lipid and protein component-containing composition to be prepared by the present process and being of use as an infant or follow-on formula or growing-up milk.

The present process enables for the use of a higher total solid content of the liquid phases to be homogenized, and in a preferred embodiment spray dried, during process step d). This significantly increases the capacity of the dryer.

According to the present invention, the liquid and the aqueous phase or a premix containing them is homogenized in process step c) in a very mild and controlled way so as to obtain lipid globules with a particle size larger, particularly slightly larger, than desired to be finally obtained in the composition to be prepared by the overall process. In the second homogenization step, namely step d), the emulsion prepared in the first homogenization step is atomized forming a spray of emulsion drops whereby the size of the lipid globules is reduced so as to prepare the finally desired particle size distribution of the lipid globules. Said second homogenization step therefore serves as a final step to determine and control the particle size distribution. The second homogenization step may preferably be conducted as a spray drying step so as to provide a dry solidified powder comprising the lipid globules. After spray drying, the lipid globule size is fixed and stable in form of a dry powder.

In a preferred embodiment, the second homogenization step, namely step d), may be followed by a drying process, for instance belt-drying.

The second homogenization step using an atomizer, thus, serves to provide a high enough stress on the first lipid and protein component-containing composition to achieve a desired atomizing effect, in particular to achieve a spray drop size distribution suitable for stable operation of a spray dryer and meeting the desired powder properties. On the other hand, the stress must be low so as to achieve large enough lipid globules to meet the desired properties.

Thus, the present invention provides for a two-step homogenization process employing a first low shear homogenization step providing lipid globules with a particular size distribution and a second low-shear homogenization step employing an atomizer to provide a controlled breakdown of the lipid globule size of the first lipid and protein component-containing composition comprising lipid globules, wherein in both homogenization steps and in the overall process of the present invention a low shear is exerted on the compositions so as to provide lipid globules with the desired comparable large droplets and wherein in both homogenization steps, namely the mixing and the atomizing, the particle size distribution is altered, namely from the components provided in steps a) and b) to a particular size distribution obtained in step c) and from the particular size distribution of the lipid globules obtained in step c) to the particular size distribution of the lipid globules obtained in step d).

In particular and preferably, lower shear forces are applied during the complete course of the present production process starting from the mixing of the aqueous and lipid phases. The present process is characterised by a very good controllability and reproducibility. Preferably, high shear forces are already avoided from the point the lipid phase is fed into the aqueous phase, which might occur before or during mixing. The present teaching, in particular the present process, results in the production of lipid globules having a volume-weighted mode diameter more close to the diameter of natural human milk lipid globules, which can be coated by a membrane of polar lipids, if desired, leading to a further resemblance of natural milk lipid globules. The composition obtainable, preferably obtained by the process according to the present invention, thus does more resemble human milk with respect to the lipid globule size and architecture. Thus, the present process preferably and advantageously does not involve high pressure and/or high energy input homogenisation devices, in particular does not use sonification or a (two-step) homogeniser, but instead uses a mixer such as an inline mixer, a static mixer or membrane emulsification. This is advantageous in so far as homogenisers typically used for such processes exert high shear forces such as resulting from pressures of 50 to 150 bars in conventional homogenizers, whereas a static or inline mixer, such as used in the present process only applies low shear forces.

Dynamic high pressure is conventionally used in the food industry and is sometimes also referred to as high pressure valve homogenization. In a preferred embodiment of the present invention, the present process does not use a dynamic high pressure homogeniser or a dynamic high pressure homogenisation step. In a preferred embodiment of the present invention, the present process does not use a dynamic high pressure one-step homogeniser or a dynamic high pressure one-step homogenisation process. In a preferred embodiment of the present invention, the present process does not use a dynamic high pressure two-step homogeniser or a dynamic high pressure two-step homogenisation process.

In the context of the present invention, a lipid globule having a diameter of >12 µm is in a preferred embodiment of the present invention a lipid globule having a diameter from 12 to 1000 µm, preferably from 12 to 500 µm, most preferred from 12 to 100 µm.

In a preferred embodiment, the present invention relates to a process according to the above, wherein less than 7 vol.-%, preferably less than 5 vol.-%, most preferably less than 3 vol.-%, of the lipid globules obtained in step c) have a diameter from 1 to 2 µm.

In a preferred embodiment, the present invention relates to a process according to the above, wherein the volume-weighted mode diameter of the lipid globules obtained in step c) is from 5 to 25 µm, preferably 6 to 18 µm, preferably 7 to 15 µm.

In a preferred embodiment, the present invention relates to a process according to the above, wherein less than 20 vol.-%, preferably less than 15 vol.-% and preferably less than 10 vol.-% of the lipid globules obtained in step c) have a diameter from 3 to 6 µm.

In a preferred embodiment, the present invention relates to a process according to the above, wherein at least 35 vol.-%, preferably at least 40 vol.-%, preferably at least 50 vol.-% and most preferably at least 60 vol.-%, of the lipid globules obtained in step c) have a diameter of at least 5 µm.

Preferably, the lipid globules of the first composition produced in step c) are lipid globules, wherein less than 50 vol.-%, preferably less than 45 vol.-% and preferably less than 40 vol.-% of the lipid globules have a diameter from 2 to 12 µm.

In a preferred embodiment, the present invention relates to a process according to the above, wherein at least 7 vol.-%, preferably at least 10 vol.-%, most preferably at least 15 vol.-%, of the lipid globules obtained in step d) have a diameter from 1 to 2 µm.

In a preferred embodiment, the present invention relates to a process according to the above, wherein the volume-weighted mode diameter of the lipid globules obtained in step d) is from 2.5 to 7.0 µm, preferably 2.5 to 6.0 µm and preferably 3.0 to 6.0 µm.

In a preferred embodiment, the present invention relates to a process according to the above, wherein at least 15 vol.-%, preferably at least 20 vol.-% and preferably at least 21 vol.-% of the lipid globules obtained in step d) have a diameter from 3 to 6 μm.

In a preferred embodiment, at least 15 vol.-% and at most 27 vol.-%, preferably at least 20 vol.-% and at most 26 vol.-%, preferably at least 21 vol.-% and at most 25 vol.-%, and preferably at least 22 vol.-% and at most 24 vol.-%, of the lipid globules obtained in step d) have a diameter from 3 to 6 μm.

In a preferred embodiment, the present invention relates to a process according to the above, wherein less than 35 vol.-%, preferably less than 30 vol.-%, preferably less than 25 vol.-% and preferably less than 22 vol.-%, of the lipid globules obtained in step d) have a diameter of at least 5 μm.

In a preferred embodiment of the present invention, at least 14 vol.-%, preferably at least 15 vol.-%, of the lipid globules obtained in step d) have a diameter of at least 5 μm.

In a preferred embodiment of the present invention, less than 35 vol.-% and at least 12 vol.-%, preferably less than 30 vol.-% and at least 14 vol.-%, preferably less than 28 vol.-% and at least 15 vol.-% and preferably less than 22 vol.-% and at least 14 vol.-% of the lipid globules obtained in step d) have a diameter of at least 5 μm.

In a preferred embodiment of the present invention, the lipid globules of the second composition obtained in step d) are lipid globules, wherein less than 61 vol.-%, preferably less than 60 vol.-%, preferably less than 55 vol.-%, preferably less than 51 vol.-%, preferably less than 50 vol.-%, of the lipid globules have a diameter from 2 to 12 μm.

In a preferred embodiment, the present invention relates to a process, wherein the first lipid and protein component-containing composition comprising lipid globules obtained in step c) comprises at least 10 vol.-% of lipid globules with a diameter >12 μm, has a volume-weighted mode diameter of the lipid globules from 5 to 25 μm, comprises less than 7 vol.-% of lipid globules with a diameter of 1 to 2 μm, comprises less than 20 vol.-% of lipid globules with a diameter from 3 to 6 μm and comprises at least 35 vol.-% of lipid globules with a diameter of at least 5 μm and wherein the second lipid and protein component-containing composition comprising lipid globules obtained in step d) comprises less than 10 vol.-% of lipid globules with a diameter of >12 μm, has a volume-weighted mode diameter of the lipid globules from 2.5 to 7.0 μm, comprises at least 7 vol.-% of lipid globules of 1 to 2 μm, comprises at least 15 vol.-% of lipid globules with a diameter from 3 to 6 μm and comprises less than 35 vol.-% of lipid globules with a diameter of at least 5.

In a preferred embodiment, the present invention relates to a process according to the above, wherein the vol.-% of the lipid globules obtained in step c) with a diameter from 1 to 2 μm is increased by at least 5%, preferably at least 10%, preferably at least 15% (each percentage point) in step d) so as to obtain the second lipid and protein component-containing composition comprising lipid globules.

In a preferred embodiment, the present invention relates to a process according to the above, wherein the vol.-% of the lipid globules obtained in step c) with a diameter of >12 μm is reduced by at least 5%, preferably at least 10%, preferably at least 15%, or preferably at least 20% (each percentage point) in step d) so as to obtain the second lipid and protein component-containing composition comprising lipid globules.

In a preferred embodiment, the present invention relates to a process according to the above, wherein the volume-weighted mode diameter of the lipid globules obtained in step c) is reduced by at least 2 μm, preferably at least 4 μm or preferably at least 6 μm, in step d) so as to obtain the second lipid and protein component-containing composition comprising lipid globules.

In a preferred embodiment, the present invention relates to a process according to the above, wherein the vol.-% of the lipid globules obtained in step c) with a diameter from 3 to 6 μm is increased by at least 5%, preferably at least 10% or preferably at least 12% (each percentage point), in step d) so as to obtain the second lipid and protein component-containing composition comprising lipid globules.

In a preferred embodiment, the present invention relates to a process according to the above, wherein the vol.-% of the lipid globules obtained in step c) with a volume of at least 5 μm is reduced by at least 25%, preferably at least 30%, preferably at least 35% or preferably at least 45% (each percentage point), so as to obtain the second lipid and protein component-containing composition comprising lipid globules.

In the context of present invention, the term "the present process" preferably encompasses a process with process steps a), b), c), d) and, if applied, an optional premixing step subsequent to process steps a) and b) and before conducting process step c), and, if applied, an optional spray-drying step in the course of conducting step d).

Preferably, the present process consists of process steps a), b), c) and d). Most preferably, the present process consists of step a), step b), premixing the liquid lipid phase with the aqueous phase, step c) and step d). Preferably, the present process consists of step a), step b), premixing the liquid lipid phase with the aqueous phase, step c) and step d) which is carried out as a spray-drying step.

In another embodiment, the present process comprises, in particular consists of process a), b), c) and d) and a subsequent belt-drying step. In another embodiment, the present process comprises, in particular consists of process step a), step b), premixing the liquid lipid phase with the aqueous phase, step c), step d) and a subsequent belt-drying step.

The process according to the present invention requires in step a) the provision of an aqueous phase with a dry matter content of 5 to 75 wt.-%, preferably 10 to 60 wt. %, preferably 15 to 55 wt. %, more preferably 20 to 50 wt. %, even more preferred 25 to 50 wt. %, preferably 25 to 45 wt. %, most preferred 30 to 50 wt % (each based on total weight of the aqueous phase), comprising at least one protein component.

It is furthermore preferred to provide the aqueous phase with a dry matter content of 30 to 60 wt. %, preferably 35 to 50 wt. %, more preferably 40 to 50 wt. %.

In the context of the present invention the term "protein component" refers to proteinaceous matter in general, which includes proteins, peptides, free amino acids but also compositions comprising proteins, peptides and/or free amino acids, i. e. are sources of protein.

The source of the protein, that means the protein component, is preferably selected in such a way that the minimum requirements of an infant for essential amino acid content are met and satisfactory growth is ensured. Hence, protein components based on cow's milk proteins such as whey protein, casein and mixtures thereof and proteins based on soy, potato or pea are preferred. In case whey proteins are used, the protein component is preferably based on acid whey or sweet whey, whey protein isolate or mixtures thereof and may include α-lactalbumin and β-lactoglobulin.

In a preferred embodiment the aqueous phase also contains at least one further component selected from the group consisting of digestible carbohydrates, non-digestible carbohydrates, vitamins, in particular water-soluble vitamins, trace elements and minerals, preferably according to international directives for infant formulae.

To prepare the aqueous phase, hereinafter also called "compounding of the aqueous phase", the at least one protein component and the above described optional further components are compounded in the aqueous phase, in particular an aqueous medium, preferably water. For this the at least one protein component as well as all other optional components may be in a dry state or present as solutions or suspensions.

Thus, said aqueous phase may be prepared for said provision step by compounding the at least one protein component and optional further components in an aqueous phase, preferably water, in the desired dry matter content. In case an aqueous phase comprising at least one protein component and optional further components is available having a lower dry matter content below 40 wt. %, such as 25%, it may be preferred to concentrate, preferably evaporate, said aqueous phase, preferably by using an evaporator, prior to step a) of the present process to yield the required dry matter content.

In a preferred embodiment, this evaporation step is conducted after an optional high heat treatment (HHT). The preferred evaporation step can be performed on the aqueous phase or, in an alternative embodiment, on the mixture of the aqueous and lipid phase, preferably after homogenisation.

Preferably, after compounding all required components in the aqueous phase the pH of the aqueous phase is adjusted to 6.0 to 8.0, more preferably to 6.5 to 7.5.

Optionally, the aqueous phase is filtered by appropriate means to prevent an entering of foreign bodies, for instance impurities or pathogens, into the process.

Optionally, the aqueous phase is pasteurised or heat treated first by a preheating step, wherein the aqueous phase is heated to 60 to 100° C., preferably to 70 to 90° C., more preferably to 85° C. with a holding time of 1 second to 6 minutes, more preferably 10 seconds to 6 minutes, even more preferably 30 seconds to 6 minutes. This leads to a pre-sterilisation of the aqueous phase.

In a preferred embodiment, preferably after heating, the aqueous phase preferably undergoes a high heat treatment (HHT), wherein it is heated to temperatures over 100° C., preferably 120 to 130° C., most preferred to 124° C. This temperature is preferably held for 1 to 4 seconds, more preferably for 2 seconds.

Alternatively, other suitable methods of pasteurisation or sterilisation can be applied. Several pasteurization and sterilisation methods are known in the art and are commercially feasible.

Preferably, the HHT is performed prior to an optionally performed concentration step, preferably evaporisation step.

In a preferred embodiment of the present invention the HHT is performed on the aqueous phase alone. Accordingly, the lipid phase is added thereafter resulting in the mixing and homogenisation of the aqueous and lipid phase. In another embodiment of the present invention the HHT is performed on the mixture of the aqueous and lipid phase. This embodiment allows to customize the obtained oil blend.

During compounding of the aqueous phase the employed shear forces are not critical. Thus, the aqueous phase may be compounded using high shear forces.

In step b) of the process according to the present invention it is preferred to provide a liquid lipid phase, which comprises at least one lipid, preferably at least one vegetable lipid. The presence of vegetable lipids advantageously enables an optimal fatty acid profile, high in (poly)unsaturated fatty acids and/or more reminiscent to human milk fat. Using lipids from cow's milk alone, or other domestic mammals, provides not in any case an optimal fatty acid profile. In particular, such a less optimal fatty acid profile, such as a large amount of saturated fatty acids, is known to result in increased obesity and a too low content of essential fatty acids.

Preferably part of the fat, that means lipid, is milk fat, more preferably anhydrous milk fat and/or butter oil. Commercially available lipids, preferably vegetable lipids, for use in the present invention preferably are in the form of a continuous oil phase. The composition obtained by the present process preferably comprises 2.1 to 6.5 g lipids per 100 ml, more preferably 3.0 to 4.0 g per 100 ml, when in liquid form, for instance as a ready-to-feed liquid or, if spray-dried, reconstituted with water.

Based on dry weight, the composition obtained by the present process preferably comprises 10 to 50 wt. %, more preferably 12.5 to 45 wt. %, preferably 12.5 to 40 wt. %, even more preferably 19 to 30 wt. % lipids.

Preferably, the lipid phase comprises 30 to 100 wt. % vegetable lipids based on total lipids, more preferably 50 to 100 wt. %. Preferably, the lipid phase comprises at least 75 wt. %, more preferably at least 85 wt. % triglycerides based on total lipids.

Preferably, the lipid phase comprises further components such as fat-soluble vitamins, preferably according to international directives for infant formulae.

According to the present invention it is preferred that the lipid phase is liquid at the temperature(s) used during the process. However, if the lipid phase is solid due to its composition it is preferably heated to above the melting temperature of the at least one lipid, preferably vegetable lipid, contained in the lipid phase. In a particularly preferred embodiment of the present invention the lipid phase is heated to a temperature above its melting point, preferably to a temperature of 40 to 80° C., preferably 50 to 70° C., more preferably to 55 to 60° C. thereby resulting in a liquid lipid phase. Most preferably, the lipid phase is heated to a temperature of at least 40° C., preferably at least 45° C., more preferably at least 50° C., most preferred to at least 55° C.

If required, the lipid phase is preferably filtered by appropriate filtration devices prior to the next step, preferably step c), to prevent foreign bodies, for instance impurities or pathogens, from entering the production process.

The lipid or fat globules of natural human milk comprise a globule membrane which comprises polar lipids, in particular phospholipids. Thus, it is desirable to provide an infant formula comprising lipid globules comprising a membrane or coating of polar lipids, in particular phospholipids. Thus, in a particularly preferred embodiment of the present process the aqueous phase, the lipid phase or the aqueous and the lipid phase comprise polar lipids, preferably phospholipids, in particular comprise added polar lipids, preferably phospholipids. If the polar lipids, in particular phospholipids are relatively pure, preferably do not contain significant quantities of other components, preferably are pure, such as soy lecithin, they are preferably added to the lipid phase. In case the polar lipids, in particular phospholipids are impure, preferably relatively impure and therefore contain significant quantities of other components which are not dissolvable in the fat or lipid phase, such as when they are present in butter milk serum powder, they are preferably added to the aqueous phase. Most preferred, the polar lipids, in particular phospholipids are comprised in the aqueous phase.

In a preferred embodiment of the present invention, the polar lipids are already contained in the lipid phase to be used according to the present invention.

In a furthermore preferred embodiment the polar lipids are added into the aqueous or the lipid phase or both provided in steps a) or b) of the present process. In a furthermore preferred embodiment the polar lipids may also be added during process step c) during mixture of the lipid and the aqueous phase.

If polar lipids are present in either the aqueous phase, which is preferred, or the lipid phase or in both, the lipid globules preferably become coated with the polar lipids.

By "coated" or "coating" is meant that the outer surface layer of the lipid globule comprises polar lipids, whereas these polar lipids are virtually absent from the core of the lipid globule. The presence of polar lipids as a coating or outer layer of the lipid globule resembles the structure of lipid globules of human milk.

Polar lipids preferably also comprise phospholipids. Preferably, the compositions comprise 0.5 to 20 wt. % phospholipids based on total lipid, more preferably 0.5 to 10 wt. %, more preferably 1 to 10 wt. %, even more preferably 2 to 10 wt. % even more preferably 3 to 8 wt. % phospholipids based on total lipid.

Preferred sources for providing the phospholipids are egg lipids, milk fat, buttermilk fat and butter serum fat, such as beta serum fat. A preferred source for phospholipids, particularly PC (phosphatidylcholine), is soy lecithin and/or sunflower lecithin. The compositions preferably comprise phospholipids derived from milk. Preferably, the compositions comprise phospholipids and glycosphingolipids derived from milk.

Preferably, the polar lipids are located on the surface of the lipid globules, that means as a coating or outer layer after the mixing step c) of the present process. This advantageously also leads to a more stable emulsion, which is especially important when the emulsion contains large lipid globules. A suitable way to determine whether the polar lipids are located on the surface of the lipid globules is laser scanning microscopy.

The concomitant use of polar lipids derived from domestic animals milk and triglycerides derived from vegetable lipids therefore enables to manufacture coated lipid globules with a coating more similar to human milk, while at the same time providing an optimal fatty acid profile. Suitable commercially available sources for milk polar lipids are BAEF, SM2, SM3 and SM4 powder of Corman, Salibra of Glanbia, and LacProdan MFGM-IO or PL20 from Aria. Preferably at least 25 wt. %, more preferably at least 40 wt. %, most preferably at least 75 wt. % of the polar lipids is derived from milk polar lipids.

The lipid globules produced by the present process preferably comprise a core and preferably a coating, wherein the core comprises a lipid, preferably vegetable lipid. Preferably, the core comprises at least 90 wt. % triglycerides, more preferably consists of triglycerides. The coating preferably comprises polar lipids, in particular phospholipids, wherein not all polar lipids that are contained in the composition need to be comprised in the coating. Preferably, at least 50 wt. %, more preferably at least 70 wt. %, even more preferably at least 85 wt. %, most preferred more than 95 wt. % of the polar lipids, in particular phospholipids present in the composition are comprised in the coating of the lipid globules. Also, not all lipids, preferably vegetable lipids, present in the composition necessarily need to be comprised in the core of the lipid globules. Preferably, at least 50 wt. %, more preferably at least 70 wt. %, even more preferably at least 85 wt. %, even more preferably at least 95 wt. %, most preferred more than 98 wt. % of the lipids, preferably vegetable lipids, comprised in the composition are comprised in the core of the lipid globules.

In a preferred embodiment, the present invention relates to a process according to the above, wherein the liquid lipid phase provided in step b) is premixed with the aqueous phase provided in step a) prior to mixing step c). In a preferred embodiment of the present invention it is, thus, required that the liquid lipid phase provided in step b) is premixed with the aqueous phase provided in step a) prior to the mixing step c). Such a premixing step aims to provide a pre-emulsion. The premixing step is preferably carried out under low shear force as defined herein. Preferably, such a premixing step is carried out in a premixer, for instance a batch mixer, in particular a propeller mixer. In a further preferred embodiment, premixing takes place during injection of the lipid phase into the aqueous phase without using a premixer. Preferably, this is realised using a dosing pump. In particular, the dosing pump injects or feeds the lipid phase into the aqueous phase in such a way that a turbulence is created in the aqueous phase, which leads to premixing of the two phases resulting in a coarse emulsion. Preferably, the dosing pump applies low pressure, in particular the pressure is lower than the pressure drop applied by the subsequent homogenization step c).

Advantageously, premixing ensures that both, the aqueous phase and the liquid lipid phase, are fed in the right quantities to the static mixer, inline mixer, rotor stator machine, a cavitator or membrane emulsification system. Since the resulting lipid droplets are still too large, no stable emulsion is formed during premixing.

In a preferred embodiment, the aqueous phase, the liquid lipid phase or most preferably both phases are prior to the premixing step heated to a temperature from 40° C. to 90° C., preferably 50° C. to 80° C., preferably of 70° C.

In a preferred embodiment of the present invention the liquid lipid phase is fed into the aqueous phase with low pressure, preferably at most 10 bar, more preferably at most 8 bar.

In a preferred embodiment, the present invention relates to a process according to the above, wherein the first homogenization step c) is carried out with a static mixer, an inline mixer, a rotor stator machine, a cavitator or by membrane emulsification. The membrane emulsification may in a preferred embodiment be carried out as rotating membrane emulsification.

According to the present invention, the first homogenization step c), preferably carried out with a static mixer, an inline mixer, a rotor stator machine, a cavitator or by membrane emulsification, is conducted in such a way that a particle size distribution as disclosed herein for the lipid globules obtained in step c) is achieved. According to the present invention, it is essential to achieve said particular particle size distribution of the lipid globules after the first homogenization step which lipid globules are significantly larger than to be finally produced according to the present process in subsequent step d). Thus, these larger lipid globules obtained in step c) are then subjected to the second homogenization step using the atomizer so as to break down in a controlled way the size of the lipid globules and to achieve and produce the desired size of the lipid globules. In a most preferred embodiment, immediately after or simultaneously to the second homogenization step a drying step is carried out, preferably the drying step is a spray-drying step. In another embodiment, the drying step can be a belt-drying step. Said drying-step, preferably spray-drying or belt-drying step, fixes the globule size obtained.

The present invention in a particularly advantageous and preferred embodiment requires to use a static mixer, an inline mixer, a rotor stator machine, a cavitator or membrane emulsification in process step c), which exert a low shear force.

In a particularly preferred embodiment it is in addition required to use the shear forces such as applied in step c), preferably low shear forces, also in process steps relating to the provided liquid lipid phase of step b), namely to process said provided liquid lipid phase under low shear forces, in particular to feed the liquid lipid phase provided in step b) under low shear force into the aqueous phase prior to or during mixing.

Step c) of the process according to the present invention requires the mixing of the lipid phase with the aqueous phase. Preferably, mixing is conducted at a ratio of 3 to 50% (w/w) preferably 5 to 40% (w/w), more preferably 10 to 30% (w/w), preferably 3 to 25% (w/w), preferably 4 to 20% (w/w) lipid to aqueous phase.

In case prior to step c) a premixing step is applied mixing is conducted at a ratio of 3 to 50% (w/w), preferably 5 to 40% (w/w), more preferably 10 to 30% (w/w), preferably 3 to 25% (w/w), preferably 4 to 20% (w/w) lipid to aqueous phase.

In the context of the present invention, a ratio of X to Y % (w/w) A to B refers to a ratio from X parts A: (100-X) parts B to Y parts A: (100-Y) parts B, e. g. 5 to 50% refers to a ratio from 5 parts lipid: 95 parts aqueous phase to 50 parts lipid: 50 parts aqueous phase.

In a particularly preferred embodiment, the total solid content of the lipid and protein component-containing composition, in particular mixture, to be homogenized in steps c) and d) has a dry matter content of 30 to 65 wt. %, preferably 40 to 60 wt. %, more preferably 50 to 60 wt. %, in particular 51 to 60 wt.-%, preferably 52 to 60 wt.-%. The temperature during mixing, i. e. step c) of the present process, preferably is from 40° C. to 90° C., preferably from 50° C. to 80° C., preferably 60° C. to 80° C., most preferred 70° C.

In the context of the present invention, the term "static mixer" refers to a device for mixing, in particular continuously, at least two fluid materials, in particular an aqueous phase and a liquid lipid phase, in particular refers to a mixer, which comprises a housing, an inlet, an outlet and at least one non-moving mixer element, wherein the housing is configured and formed in a way to force substantially all, preferably all, of the fluid to be mixed along the at least one non-moving mixer element. The housing and the at least one mixer element are designed so as to allow the fluid stream moving through the mixer to be blended by the non-moving mixer elements.

In a preferred embodiment of the present invention, the rotor stator machine uses a tip speed of 1 to 30 m/s, preferably 5 to 20 m/s and preferably 7 to 15 m/s, preferably using a slit width of below 1.5 mm, preferably below 1 mm.

Thus, the present invention preferably requires to use a static mixer which is configured and operated so as to achieve the desired particle size distribution, in particular so as to achieve a pressure drop during the mixing step c) of 0.5 to 30 bar, preferably 1 to 15 bar, preferably 2 to 12 bar, preferably 2 to 10 bar, preferably 2 to 5 bar, preferably 3 to 5 bar. Said pressure drop is measured as the difference of the pressure determined at the inlet of the static mixer housing and the outlet of the static mixer housing. A skilled person can easily determine the configuration and set up of a static mixer, e. g. length and diameter of the mixing elements, to achieve the desired pressure drop.

In the context of the present invention, the configuration of said static mixer is preferably determined by the size and shape of the housing and the size and shape of the at least one mixer element contained therein. In the context of the present invention, the operating conditions used with the present static mixer are preferably the pressure applied at the inlet of the static mixer, the flow rate and the speed of the composition flowing through the static mixer.

In a preferred embodiment, the static mixer is operated with a flow rate of 1.5 to 8 l/min, preferably 2 to 7 l/min, preferably 2 to 6 l/min, preferably 5 to 7 l/min, preferably 4 to 6 l/min.

In a preferred embodiment, the static mixer is operated with a speed of 0.3 to 2.5 m/s, preferably 0.5 to 2 m/s, preferably 0.5 to 1.5 m/s.

In a preferred embodiment of the present invention the lipid phase is mixed with the aqueous phase in step c) of the present process, preferably in a circular cylindrical static mixer with a diameter of 2 to 10, preferably 3 to 7, preferably 4 mm with a flow rate from 1.5 l/min to 8 l/min, preferably 2.0 l/min to 7 l/min, most preferably 5 l/min to 7 l/min or 4 to 6 l/min.

Preferably, the static mixer employing said flow rate has a housing with a diameter of 2 to 10, preferably 3 to 7, preferably 4 mm and a length from 80 to 150, preferably 90 to 110, in particular 100 mm.

In a preferred embodiment, the speed of the composition flow in the static mixer is from 5 to 40 m/s, preferably 10 to 30 m/s, preferably 10 to 20 m/s.

In a preferred embodiment of the present invention, the pressure applied at the inlet of the static mixer is from 2 to 30 bar, preferably 2 to 20 bar, preferably 2 to 15 bar, preferably 2 to 12 bar, preferably 2 to 10 bar, preferably 2 to 8 bar.

Thus, most preferred, the pressure drop equals the pressure applied at the inlet of the static mixer so that there is no pressure at the outlet of the static mixer. However, in another embodiment, the pressure applied at the inlet of the static mixer is greater than the pressure drop, so that there is a pressure of for example 5 bar, preferably 3 bar at the outlet of the static mixer.

The static mixer preferably used in the present invention preferably has a cylindrical, for instance tubular, in particular pipe-like or tube-like, housing or a squared housing. Preferably, the housing is tubular, that means in form of a circular cylinder. The housing, preferably the tubular housing, has preferably a diameter of 3 to 10, preferably 3 to 8, preferably 4 mm. The housing comprises at least one inlet, preferably one or two inlets, for delivery of the incoming feed fluids. Within said housing at least one mixer element, preferably at least four mixer elements, for instance a baffle or a series of baffles, is positioned.

Preferably, the static mixer has at least 4, preferably at least 5, preferably at least 6 mixer elements. Most preferred, the static mixer has between 6 and 20, preferably 7 to 18, most preferred 8 to 16 mixer elements.

In a preferred embodiment of the present invention, the at least one mixer element has a length of 3 to 5 mm, in particular 4 mm.

Preferably, the housing of the static mixer has a length of 80 to 150, preferably 90 to 110 and preferably 100 mm.

In a preferred embodiment of the present invention, the housing, in particular the tubular housing has a diameter of 3 to 10, preferably 3 to 8, preferably 4 mm and a length of 80 to 150, preferably 90 to 110 and preferably 100 mm.

In a preferred embodiment of the present invention, the static mixer does not comprise any moving element, in particular no rotor and no rotating element.

In a preferred embodiment of the present invention, the at least one mixer element is of helical shape. Thus, such a static mixer is a helical static mixer. In a further preferred embodiment, the at least one mixer element is of plate-like shape. Thus, such a static mixer is a plate-type static mixer. Preferably, the at least one mixer element is able to produce simultaneously patterns of flow division and radial mixing.

Thus, to facilitate mixing according to the present invention, a static mixer preferably can be used. The static mixer disperses one liquid phase, i. e. the liquid lipid phase of the present invention, into a main continuous phase, i. e. the aqueous phase of the present invention, with which it would normally be immiscible in order to prepare a oil-in-water emulsion. Thus, for the mixing step of the present process preferably a static mixer is used to create an emulsion, preferably a stable emulsion, comprising lipid globules. Preferably, the lipid phase is emulsified in the aqueous phase under such conditions that large lipid globules are created.

Preferably, the lipid phase is added or injected into the aqueous phase shortly before entering the static mixer. Preferably already from this point onwards and including it, high shear forces are to be avoided in the process according to the present invention.

In the context of the present invention the term "inline mixer" can refer to a mixer, which comprises a housing, an inlet, an outlet and at least one mixing head comprising at least one stator and at least one rotor, wherein the housing is configured and formed in a way to force substantially all, preferably all, of the fluid to be mixed through the at least one mixing head. To facilitate mixing a medium or high speed inline mixer, with one or more mixing head(s) is used. An inline mixer disperses one liquid phase, i. e. the liquid lipid phase of the present invention, into a main continuous phase, i. e. the aqueous phase of the present invention, with which it would normally be immiscible in order to prepare an oil-in-water emulsion. Thus, for the mixing step of the present process preferably an inline mixer is used to create an emulsion, preferably a stable emulsion, comprising lipid globules. Preferably, the lipid phase is emulsified in the aqueous phase under such conditions that large lipid globules are created. Preferably, the used inline mixer consists of a rotor, a set of rotors or rotating disc(s) and a same amount of stationary discs known as stator(s), wherein each pair of rotor or rotating disc and stator is referred to as mixing head. The rows of rods or pins positioned on both the rotor and stator discs create rapidly changing speed differences in a mixing head through which the solutions to be mixed flow. Preferably, the lipid phase is added or injected into the aqueous phase shortly before entering the inline mixer. Preferably already from this point onwards, high shear forces are to be avoided in the process according to the present invention.

In general, shear is created in an inline mixer by the rotating and static pins of the mixing head through which the fluid is forced, that means the fluid experiences the speed of one rotating pin and then almost no speed at a static pin. Depending on the number of rows of pins on each disc this can be repeated several times. An inline mixer for preferred use in the present invention uses a rotating disc or high speed rotor, or a series of such inline rotors, also called mixing heads, usually powered by an electric motor, to create flow and shear, preferably low shear. Low shear is meant to refer to lower shear than applied during conventional homogenization. The velocity, or tip speed of the fluid at the outside diameter of the rotor will be higher than the velocity at the centre of the rotor, which creates shear. In an inline mixer, for preferred use in the present invention, the rotor-stator array or mixing head is contained in a housing with an inlet at one end and an outlet at the other. Such a housing can also contain more than one mixing head. Depending on the specific inline mixer model the fluid flows from the outside to the inside of the discs or vice versa. Mostly, the components to be mixed are drawn through the rotor-stator array in a continuous stream, with the whole acting as a centrifugal pumping device. Alternatively, a pump vane can be added to the mixer shaft. Thus, inline mixers offer a more controlled mixing environment and can preferably be used in the present process as part of a continuous production process, preferably resulting in a more economical production process.

Preferably, a medium or high speed inline mixer, in particular a high speed inline mixer, is used in the process according to the present invention.

In the present process it is preferred to avoid high shear forces. Thus, it is preferred to use lower shear force relative to standard homogenisation during the complete process, preferably at least from the fat injection point onwards and including it, that means during and after the step of feeding the liquid lipid phase into the aqueous phase, e. g. prior to or during mixing step c).

In general, homogenisation is used to emulsify the lipid phase in the aqueous phase to reduce creaming and oxidation of the fatty acids. In standard infant formulae rather small globules are produced leading to a very stable emulsion. Since the present process aims to produce larger lipid globules this might result in a less stable emulsion. The presence of a little bit of creaming was even found to be advantageous since it mimics the situation during breast feeding.

In a particularly preferred embodiment of the present process the lipid and protein component-containing composition obtained in step c) is then reheated to 75 to 85° C., preferably 78 to 80° C. to further reduce, preferably completely eliminate pathogenic bacteria. Advantageously, reheating at this stage also leads to a reduction of viscosity.

For the second homogenization step employing an atomizer, process conditions to operate the atomizer are used which achieve the desired reduction of the lipid globule particle size as disclosed herein, in particular provide the desired particle size distribution of lipid globules obtained in step d) of the present process.

In the context of the present invention, an atomizer is an equipment, which breaks bulk liquid into small droplets forming a spray.

In a preferred embodiment, the present invention relates to a process according to the above, wherein the atomizer used in step d) for atomizing, in particular for spray drying, is a pneumatic atomizer or a rotary atomizer.

In the context of the present invention, a pneumatic atomizer refers to both internal and external two- or twin- or multiple-fluid atomizers, wherein at least one fluid is a gas and the other fluid is a liquid and wherein the gas supplies the majority of the energy required to atomize the liquids.

In a preferred embodiment, pneumatic atomizers may be used which may be airblast atomizers, that means internal mixing two-fluid atomizers, prefilming airblast atomizers, which are also internal mixing two-fluid atomizers, plain jet airblast atomizers, which are external mixing two-fluid atomizers, or effervescent atomizers, which are special internal mixing two-fluid atomizers. Further, air assist atomizers, namely atomizers using internal and external two-fluid atomizers, may be used.

In a preferred embodiment, the present invention relates to a process according to the above, wherein the pneumatic atomizer is a two-fluid atomizer. In a further embodiment of the present invention, the pneumatic atomizer may also be a multiple-fluid atomizer. In a preferred embodiment of the present invention, the second homogenization step d) is carried out as a spray drying step so as to obtain a spray-dried lipid and protein component-containing composition comprising lipid globules.

In the context of the present invention the term "spray-drying" refers to a process of transforming a feed from a fluid state into a dried particulated form, in particular by spraying the feed into a hot drying medium. Spray-drying involves a step of atomization of the liquid feed into fine droplets, of mixing these droplets with a heated gas stream allowing the liquid to evaporate and leave dried solids and optionally separating the dried product from the gas stream to be collected.

In the context of the present invention, the term telt-drying' refers to a process of transforming a wet feed from a fluid state into a dried, particulated form, in particular by feeding the feed onto a belt, preferably a perforated belt, which carries the feed through a drying area, preferably the drying are being divided into several sections. In the drying area, drying gas flows through or/and over the wet feed and dries it.

Preferably, the liquid feed may be a solution, slurry, emulsion, gel or paste and must be capable of being atomized. The process preferably involves bringing together a highly dispersed liquid and a sufficient volume of hot gas, in particular air, to produce evaporation and drying of the liquid droplets obtained by the atomization. Preferably, the air supplies heat for evaporation and conveys the dried product to a collector.

In the context of the present invention, a rotary atomizer, also called a wheel or a disc atomizer, is an atomizer, which uses energy of a high-speed rotating wheel to divide bulk liquid into droplets. Preferably, the feed is introduced at the center of the wheel, flows over the surface to the periphery and disintegrates into droplets when it leaves the wheel.

Once the liquid is atomized it is brought into intimate contact with the heated gas for evaporation to take place equally from the surface of all droplets within the drying chamber. The heated gas is preferably introduced into the chamber by an air disperser, which ensures that the gas flows equally to all parts of the chamber.

The atomizer, preferably the low shear atomizer, of the present invention is in a preferred embodiment a rotary atomizer, also called wheel atomizer, or a pneumatic atomizer, preferably a two-fluid atomizer, which both preferably exert low shear forces onto the lipid and protein component-containing composition to be spray-dried.

Preferably, the second homogenization step uses an atomizer, preferably a low shear atomizer, which employs a pump, preferably a low pressure pump, to control the feed of the composition obtained in step c) to the atomizer, preferably the spray dryer. Preferably, a positive displacement pump is used to control the feed of the mixture to the atomizer, preferably the spray dryer. A positive displacement pump causes a fluid to move by trapping a fixed amount of the fluid and then displacing the trapped volume of fluid into the discharge pipe.

If a two-fluid atomizer is used for the second homogenization step, preferably spray-drying, the two-fluid atomizer is used with a pressure of at most 10 bar, preferably at most 8 bar.

Preferably, the present invention relates to a process as identified above, wherein the pressures of both air and liquid used for spray-drying are at most 10 bar, preferably at most 8 bar, preferably if a two-fluid atomizer is used.

Two-fluid atomizers (2F atomizer) are commercially available. The atomizers can be equipped with an external mixing cap or with an internal mixing cap. Internal 2F atomizers have the advantage to have slightly lower energy requirements. Internal and external 2F atomizers yield different spray angles and it will depend on the design of the used dryer which type of 2F atomizer is preferred. This is easily deducible to a person skilled in the art.

In a preferred embodiment, an internal or external mixing atomizer is preferred.

The pressure used for the two-fluid atomizer might differ according to which specific model is used but can be determined accordingly by a skilled person under the condition that the lipid globules produced in the mixing step are reduced to a particle size as disclosed herein, simultaneously, however, not subjecting them to higher shear forces than required.

In a preferred embodiment, both process step c), that means mixing of the lipid and aqueous phase, and process step d), namely atomizing, preferably the spray-drying are conducted under conditions exerting low forces, preferably shear forces, onto the composition processed.

The preferred two-fluid atomizers have preferably a particularly high spraying capacity, which is advantageous for an economical production. Further, the preferred use of a two-fluid atomizer allows for much lower pressures to be applied during spray-drying, which preferably results in a reduction of shear forces exerted onto the lipid globules. In spray-drying processes known in the art pressures as high as 200-300 bar are used. In a preferred embodiment of the present process, the pressure used for atomizing, preferably spray-drying, is at most 10 bar, preferably below 10 bar, preferably at most 9 bar, preferably below 9 bar, more preferably at most 8 bar, preferably below 8 bar.

In a preferred embodiment of the present invention, a rotary atomizer is used for atomizing, preferably spray-drying. Preferably, the rotary atomizer is configured and operated in such a way so as to reduce the particle size of the globules obtained in step c) and to achieve the desired particle size distribution of the obtained composition.

In the context of the present invention, the configuration of said rotary atomizer is preferably determined by the wheel diameter.

In the context of the present invention, the operating conditions used with the present rotary atomizer are preferably the tip speed of the wheel, the rotational speed of the wheel and the inlet temperature of the air introduced into the spray dryer.

In particular the present invention employs preferably a rotary atomizer having a wheel diameter of 100 to 250 mm, preferably of 100 to 150 mm, more preferably of 120 mm. In a furthermore preferred embodiment of the present invention the rotary atomizer is operated with a tip speed of the wheel from 50 to 120 m/s, preferably from 60 to 100 m/s, more preferably from 65 to 95 m/s, most preferred from 70 to 90 m/s.

In a preferred embodiment of present invention, the rotational speed employed in the rotary atomizer, hereinafter also termed wheel speed, is from 10000 to 15000 rpm (rotations per min), preferably 11000 to 14000, preferably 11000 or 14000 rpm.

The above mentioned parameters of wheel diameter, tip speed and wheel speed of the rotary atomizer are interlinked, which means that if one is changed, the other two will change as well. In the context of the present invention, tip speed is the parameter most preferred.

In a furthermore preferred embodiment of the present invention the inlet temperature employed in the atomizer, preferably the spray dryer, is from 150 to 230° C., preferably from 160 to 220° C. and preferably 170 to 210° C.

In a preferred embodiment of the present invention, the atomizer, in particular the rotary atomizer, is employed with a tip speed of 65 to 95 m/s, preferably 70 to 90 m/s and an inlet temperature of the atomizer, preferably spray dryer, of 150 to 230° C., preferably 160 to 220° C. and preferably 170 to 210° C. In a furthermore preferred embodiment of the present invention, the atomizer is employed with a tip speed of 65 to 95 m/s, preferably 70 to 90 m/s and an inlet temperature of the atomizer, preferably spray dryer, of 193° C. In a furthermore preferred embodiment of the present invention, the atomizer is employed with a tip speed of 65 to 95 m/s, preferably 70 to 90 m/s and an inlet temperature of the atomizer, preferably spray dryer of 175° C.

The gas used for spraying with the pneumatic nozzle, preferably the two-fluid nozzle, is preferably compressed air. Preferably, the gas used for drying is preferably filtered atmospheric air. The gas/liquid flow ratio's (kg/kg) is preferably from 1:1 to 1:19, preferably 1:1 to 1:9, in particular 1:2.

Furthermore preferred, the drying gas has an inlet temperature of at least 150° C., preferably at least 160° C., preferably at least 170° C., preferably 150 to 230° C., preferably 160 to 220° C. and preferably 170 to 210° C.

Preferably, the spray-dried lipid and protein component-containing composition is obtained subsequent to spray-drying according to the present invention as a spray-dried powder which preferably can then be filled in appropriate containers. Thus, the present composition is in one embodiment in solid form, preferably spray-dried form, preferably powdered form.

In a preferred embodiment, a dried lipid and protein component-containing composition is obtained subsequent to a drying step, in particular a belt-drying step, which, preferably, can then be filled in appropriate containers. Thus, the present composition is in one embodiment in solid form, preferably belt-dried form, preferably powdered form.

In a particularly preferred embodiment further components which are already present in dry form, such as some minerals, vitamins, and non-digestible oligosaccharides are dry blended into the dried, preferably belt-dried or spray-dried lipid and protein component-containing composition before it is filled into containers.

However, the present dried, preferably spray-dried or belt-dried, composition may also be in liquid form, preferably after reconstitution of the obtained dried, preferably spray-dried or belt-dried, form in an aqueous medium.

Advantageously, the larger lipid globules, which preferably are coated by a membrane of polar lipids and thus more resemble the diameter and composition of natural human milk lipid globules are also preserved after the optional drying step, in particular spray-drying or belt-drying, in particular after subsequent reconstitution in an aqueous medium. Thus, upon reconstitution with water the dried, preferably spray-dried or belt-dried, composition prepared by the present process still displays these features.

In case ingredients specified herein to be added either to the aqueous or the lipid phase are sensitive to the temperature(s) or conditions employed during any of the steps of the process according to the present invention they might also be added at a later point in the process, such as after mixing and before the optional drying, preferably spray-drying or even after spray-drying.

The present invention also relates to a lipid and protein component-containing composition obtained according to the present process, particularly being defined by a particle size distribution of the lipid globules as obtained according to step d) of the present invention.

Thus, the present invention provides a lipid and protein-containing composition comprising lipid globules, preferably obtainable, most preferred obtained, according to the present process, in particular in step d), which composition a) comprises less than 10 vol.-% of lipid globules with a diameter of >12 µm and/or is characterized by lipid globules with a volume-weighted mode diameter from 2.5 to 7.0 µm and b) comprises at least 15 vol.-% of lipid globules with a diameter from 3 to 6 µm and c) comprises at least 7 vol.-% of lipid globules with a diameter from 1 to 2 µm.

In a preferred embodiment of the present invention, there is provided a lipid and protein-containing composition comprising lipid globules, preferably obtainable, most preferred obtained, according to the present process, in particular in step d), which composition a) comprises preferably 0 to 4 vol.-% of lipid globules with a diameter >12 µm and/or is characterized by lipid globules with a volume-weighted mode diameter from 2.5 to 6.0 µm and b) comprises 20 to 60 vol.-% of lipid globules with a diameter from 3 to 6 µm and c) comprises at least 10 vol.-% of lipid globules with a diameter from 1 to 2 µm.

In a preferred embodiment, the present invention provides a lipid and protein component-containing composition comprising lipid globules, preferably obtainable, most preferred obtained, according to the present process, in particular in step d), which composition a) comprises less than 10 vol.-% of lipid globules with a diameter of >12 µm and/or is characterized by lipid globules with a volume-weighted mode diameter from 2.5 to 7, and b) comprises at least 7 vol.-% of lipid globules with a diameter of 1 to 2 µm, and c) comprises at least 15 vol.-% of lipid globules with a diameter from 3 to 6 µm and d) comprises less than 35 vol.-% of lipid globules with a diameter of at least 5.

Preferably, the lipid and protein component-containing composition obtained by the process according to the present invention is a nutritional or pharmaceutical composition, preferably an infant formula or a follow-on formula or a growing up milk. Thus, preferably, the compositions are liquid or a powder suitable for making a liquid composition after reconstitution with an aqueous solution, preferably water. Preferably, the dried composition, preferably the spray-dried or belt-dried, composition of the present invention is reconstituted, preferably with water, just prior to consumption. This will ensure stability of the emulsion, although a little bit of creaming can occur due to the large lipid globules of the present composition. A small amount of creaming is beneficial since this also closely resembles the conditions of breast feeding.

Thus, the lipid and protein component-containing compositions obtained according to the present invention are preferably administered to a human subject with an age of at most 36 months, preferably of at most 18 months, more preferably of at most 12 months, even more preferably of at most 6 months. In particular, the compositions obtained by the present process are suitable and prepared for providing the daily nutritional requirements to a human subject with an age of at most 36 months, in particular an infant with an age of at most 24 months, even more preferably an infant with an age of at most 18 months, most preferably with an age of at most 12 months. Hence, the lipid and protein component-containing composition or the spray-dried lipid and protein component-containing composition are used for feeding a human subject. Advantageously, it was found that the administration of a composition containing large lipid globules, preferably coated with polar lipids, prevents or reduces the risk of obesity and improves body composition, i. e. increases lean body mass and decreases fat mass, later in life.

After the optional drying step, preferably the spray-drying or belt-drying, the composition of the present invention is suitably in a powdered form, which can preferably be reconstituted with water to form a liquid. In a preferred embodiment it is foreseen to add an aqueous medium, preferably water, to the dried composition, preferably the spray-dried or belt-dried, composition obtained so as to obtain a liquid or semi-liquid reconstituted dried composition, preferably spray-dried or belt-dried, composition of the present invention. Thus, the present invention also relates to a liquid or semi-liquid reconstituted composition comprising the dried composition, preferably the spray-dried or belt-dried, composition obtained after spray-drying or belt-drying according to the present process in an aqueous medium. When the dried composition, preferably the spray-dried or belt-dried, composition is in a liquid form, the preferred volume administered on a daily basis is in the range of about 80 to 2500 ml, more preferably about 450 to 1000 ml per day. These amounts are also preferred for the liquid lipid and protein component-containing composition.

In a further preferred embodiment of the present invention, the present solid dried composition, preferably the spray-dried or belt-dried, composition or the liquid reconstituted dried composition, preferably the spray-dried or belt-dried, composition as well as the liquid lipid and protein component-containing composition may be supplemented with at least one further substance, in particular a pharmaceutically or nutritionally effective substance so as to obtain a pharmaceutical or nutritional composition comprising the present dried composition, preferably the spray-dried or belt-dried, reconstituted or liquid composition.

The term "volume-weighted mode diameter" (or mode diameter based on volume) relates to the diameter which is the most present based on volume of total lipid, or the peak value in a graphic representation, having on the x-axis the diameter and on the y-axis the volume in %.

In the context of the present invention, the term 'volume-% (vol.-%)' of lipid globules refers to the volume in percent of a particular population of lipid globules having a particular diameter or diameter range in relation to the overall volume of all lipid globules in the composition, if not stated otherwise.

In this document and in its claims, the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there be one and only one of the elements. The indefinite article "a" or "an" thus usually means "at least one".

Further preferred embodiments of the present invention are subject of the subclaims.

The invention is further described by way of the following example and the accompanying FIGURE.

The FIG. shows:

FIGURE shows a flow scheme of the present process, also described in the example, wherein comp. is short for components and panels with solid lines represent the aqueous phase, panels with bold lines represent the lipid phase and panels with double lines represent the mixture, i. e. the emulsion of both phases.

EXAMPLE

Process of the present invention (A):

An infant formula was prepared being a powder comprising per kg final product about 4600 kcal, about 210 g lipid, about 525 g digestible carbohydrates, about 39 g non-digestible oligosaccharides and about 150 g protein. The composition was prepared using whey protein concentrate, skimmed milk powder, lactose, a vegetable oil blend (fat) and non-digestible oligosaccharides. Also vitamins, minerals, trace elements as known in the art were used.

An aqueous phase, comprising, protein, digestible carbohydrates and the other ingredients, except the fat and fat soluble vitamins, was prepared as known in the art. The dry matter content of the aqueous phase was between 40 to 60 wt. %. The aqueous phase was pasteurized for 6 minutes at 85° C.

A fat phase was prepared as known in the art. The vegetable oil blend was heated to 60° C. and added to the water phase in a w/w ratio of from 15 to 20 and premixed with a Typhoon propeller mixer. The total solid content of the fat and aqueous phase mixture was between 40 and 60 wt %.

The pre-emulsion was fed into a stator rotor machine (IKA) having a tip speed of 7 to 15 m/s and a slit width of less than 1 mm After the first emulsification step, the product was collected and emulsified a $2n^d$ time using pneumatic atomizers (2F) at 3 to 4 bar air pressure.

Control Process (B):

In a control experiment (designated B) the material and process parameters exactly as indicated above for the inventive process (A) were used except for a tip speed above 30 m/s.

The table below shows an analysis of the particle size distribution of lipid globules obtained according to the two-step emulsification process according to the present invention (A) which, thus, employs a first lipid globule particle size determining mixing step and a second lipid globule particle size determining atomizing step and a control (B).

TABLE

|  | A, before atomizing step | A, after atomizing step | delta | B, before atomizing step | B, after atomizing step | delta |
|---|---|---|---|---|---|---|
| Volume-based mode diameter μm | 12.07 | 3.42 | −8.65 | 4.40 | 2.92 | −1.48 |
| 2-12 μm v % | 39.42 | 48.93 | 9.51 | 71.08 | 52.55 | −18.53 |
| 3-6 μm v % | 8.84 | 23.36 | 14.52 | 36.92 | 27.10 | −9.82 |
| >12 μm v % | 33.68 | 2.71 | −30.97 | 1.59 | 0.06 | −1.53 |

TABLE-continued

|  | A, before atomizing step | A, after atomizing step | delta | B, before atomizing step | B, after atomizing step | delta |
|---|---|---|---|---|---|---|
| >5 μm v % | 67.68 | 20.10 | −47.58 | 31.79 | 11.84 | −19.95 |
| 1-2 μm v % | 0.4 | 17.1 | 16.7 | 7.8 | 20.6 | 12.8 |

(μm = micrometer; v % = vol.-%)
A: two-step homogenization process of the present invention,
B: control one-step homogenization process It is evident that the present process significantly alters the particle size distribution of the first protein and lipid-component containing composition during the second homogenization step, in particular increases the amount of smaller lipid globules and reduces the lipid globule size while in the control process the atomizing step has a much less pronounced effect on the particle size distribution.

In an optional embodiment, the composition obtained after by the second homogenization, that means emulsification step, may be dried, in particular spray-dried or belt-dried.

The invention claimed is:

1. A process for preparing a lipid and protein component-containing composition, which is an infant or follow-on formula or a growing up milk and which comprises lipid globules, comprising the steps of:

a) providing an aqueous phase with a dry matter content of 5 to 75 wt. % (based on total weight of the aqueous phase), which comprises at least one protein component, b) providing a liquid lipid phase, which comprises at least one lipid, c) carrying out a first homogenization step by homogenizing the lipid phase with the aqueous phase in a ratio of 3 to 50% (w/w) lipid to aqueous phase so as to obtain a first lipid and protein component-containing composition comprising lipid globules, wherein at least 10 vol.-% of the lipid globules have a diameter of >12 μm and/or wherein the lipid globules have a volume-weighted mode diameter from 7 to 15 μm, and d) carrying out a second homogenization step by homogenizing the first lipid and protein component-containing composition obtained in step c) with an atomizer, wherein the particle size of the lipid globules obtained in step c) is reduced so as to obtain a second lipid and protein component-containing composition comprising lipid globules, wherein less than 10 vol.-% of the lipid globules have a diameter of >12 μm and/or wherein the lipid globules have a volume-weighted mode diameter from 3 to 6 μm, wherein the first homogenization step c) is conducted using a rotor stator machine that uses a tip speed of 1 to 15 m/s.

2. The process according to claim 1, wherein less than 20 vol.-% of the lipid globules obtained in step c) have a diameter from 3 to 6 μm.

3. The process according to claim 1, wherein at least 35 vol.-% of the lipid globules obtained in step c) have a diameter of at least 5 μm.

4. The process according to claim 1, wherein less than 7 vol.-% of the lipid globules obtained in step c) have a diameter from 1 to 2 μm.

5. The process according to claim 1, wherein at least 15 vol.-% of the lipid globules obtained in step d) have a diameter from 3 to 6 μm.

6. The process according to claim 1, wherein less than 35 vol.-% of the lipid globules obtained in step d) have a diameter of at least 5 μm.

7. The process according to claim 1, wherein at least 7 vol.-% of the lipid globules obtained in step d) have a diameter from 1 to 2 μm.

8. The process according to claim 1, wherein the first lipid and protein component-containing composition comprising lipid globules obtained in step c) comprises at least 10 vol.-% of lipid globules with a diameter >12 μm, has a volume-weighted mode diameter of the lipid globules from 7 to 15 μm, comprises less than 7 vol.-% of lipid globules with a diameter from 1 to 2 μm, comprises less than 20 vol.-% of lipid globules with a diameter from 3 to 6 μm and at least 35 vol.-% of lipid globules have a diameter of at least 5 μm and wherein the second lipid and protein component-containing composition comprising lipid globules obtained in step d) comprises less than 10 vol.-% of lipid globules with a diameter of >12 μm, has a volume-weighted mode diameter of the lipid globules from 3 to 6 μm, comprises at least 7 vol.-% of lipid globules with a diameter from 1 to 2 μm, and comprises at least 20 vol.-% of lipid globules with a diameter from 3 to 6 μm and less than 35 vol.-% of lipid globules with a diameter of at least 5 μm.

9. The process according to claim 1, wherein the vol.-% of the lipid globules obtained in step c) with a diameter from 1 to 2 μm is increased by at least 5% (percentage point) in step d) so as to obtain the second lipid and protein component-containing composition comprising lipid globules.

10. The process according to claim 1, wherein the vol.-% of the lipid globules obtained in step c) with a diameter of >12 μm is reduced by at least 5% (percentage point) in step d) so as to obtain the second lipid and protein component-containing composition comprising lipid globules.

11. The process according to claim 1, wherein the volume-weighted mode diameter of the lipid globules obtained in step c) is reduced by at least 2 μm in step d) so as to obtain the second lipid and protein component-containing composition comprising lipid globules.

12. The process according to claim 1, wherein the vol.-% of the lipid globules obtained in step c) with a diameter from 3 to 6 μm is increased by at least 5% (percentage point) in step d) so as to obtain the second lipid and protein component-containing composition comprising lipid globules.

13. The process according to claim 1, wherein the vol.-% of the lipid globules obtained in step c) with a diameter of at least 5 μm is reduced by at least 25% (percentage point) in step d) so as to obtain the second lipid and protein component-containing composition comprising lipid globules.

14. The process according to claim 1, wherein the liquid lipid phase provided in step b) is premixed with the aqueous phase provided in step a) prior to mixing step c).

15. The process according to claim 1, wherein the atomizer is a pneumatic atomizer or a rotary atomizer.

16. The process according to claim 15, wherein the pneumatic atomizer is a two-fluid atomizer.

17. The process according to claim 1, wherein immediately after or simultaneously to the second homogenization step a drying step is carried out.

18. The process according to claim 1, wherein the second homogenization step d) is carried out as a spray-drying step so as to obtain a spray-dried lipid and protein component-containing composition comprising lipid globules.

19. The process according to claim 1, wherein the protein component is selected from the group consisting of skim milk, whey, whey protein, whey protein isolate, whey protein hydrolysate, casein, casein hydrolysate and soy protein.

20. The process according to claim 1, wherein the aqueous phase comprises at least one further component selected from the group consisting of digestible carbohydrates, non-digestible carbohydrates, vitamins and minerals.

21. The process according to claim 1, wherein subsequent to step a) and prior to step c) the aqueous phase is sterilised or pasteurised.

22. The process according to claim 1, wherein the aqueous phase, the lipid phase, or the aqueous and the lipid phase comprise polar lipids, in particular phospholipids in an amount of 0.5 to 20 wt. % (based on total lipid of the composition).

23. The process according to claim 1, wherein the tip speed is 7 to 15 m/s.

* * * * *